(12) United States Patent  (10) Patent No.: US 7,665,984 B2
Teng  (45) Date of Patent: Feb. 23, 2010

(54) PLATEN-LINKAGE ASSEMBLY OF INJECTION MOLDING SYSTEM

(75) Inventor: Alex Teng, Richmond Hill (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 233 days.

(21) Appl. No.: 11/956,365

(22) Filed: Dec. 14, 2007

(65) Prior Publication Data

US 2009/0155406 A1  Jun. 18, 2009

(51) Int. Cl.
   *B29C 45/64* (2006.01)
(52) U.S. Cl. .................. 425/576; 425/588; 425/592
(58) Field of Classification Search .............. 425/190, 425/588, 592, 451.5, 576
   See application file for complete search history.

(56) References Cited

U.S. PATENT DOCUMENTS

| | | | |
|---|---|---|---|
| 4,207,051 A | 6/1980 | Wright et al. | |
| 4,408,981 A | 10/1983 | Brown | |
| 5,354,196 A | 10/1994 | Ziv-Av | |
| 5,707,666 A | 1/1998 | Disimone et al. | |
| 6,099,784 A * | 8/2000 | Teng et al. | 425/592 |
| 6,155,811 A | 12/2000 | Looije et al. | |
| 6,503,075 B1 | 1/2003 | Schad et al. | |
| 7,125,247 B2 | 10/2006 | Glaesener et al. | |
| 7,229,268 B2 | 6/2007 | Disimone | |
| 2006/0263470 A1 | 11/2006 | Vanderploeg et al. | |
| 2007/0213868 A1 | 9/2007 | MacDonald et al. | |
| 2007/0250207 A1 | 10/2007 | MacDonald et al. | |

\* cited by examiner

*Primary Examiner*—James Mackey
(74) *Attorney, Agent, or Firm*—Husky Intellectual Property Services

(57) ABSTRACT

Disclosed is a platen-linkage assembly, including: (i) a pair of supports being movably guidable along a respective one of a pair of linear-guide rails, (ii) mold-carrier sections being configured to support a mold stack; and (iii) a pair of primary links being rotatably coupled with and being positioned between a chosen one of: (i) the mold-carrier sections, and (ii) the pair of supports.

9 Claims, 4 Drawing Sheets

PLATEN-LINKAGE ASSEMBLY OF INJECTION MOLDING SYSTEM

TECHNICAL FIELD

The present invention generally relates to, but is not limited to, molding systems, and more specifically the present invention relates to, but is not limited to, (i) injection-molding systems, and/or (ii) platen-linkage assemblies of injection-molding systems.

BACKGROUND

Examples of known molding systems are (amongst others): (i) the HyPET (TRADEMARK) Molding System, (ii) the Quadloc (TRADEMARK) Molding System, (iii) the Hylectric (TRADEMARK) Molding System, and/or (iv) the HyMET (TRADEMARK) Molding System, all manufactured by Husky Injection Molding Systems (Location: Canada; Web Site: www.husky.ca).

U.S. Pat. No. 4,207,051 (Inventor: WRIGHT et al.; Published: Jun. 10, 1980) discloses a stripper arrangement for an injection mold, which has a plate driven via a rack and pinion by a lost motion link to ensure positive stripping.

U.S. Pat. No. 4,408,981 (Inventor: BROWN; Published: Oct. 11, 1983) discloses an injection molding machine with supported stack mold inner plates, which has an intermediate platen with outrigger arms terminating in part-cylindrical shoes engaging tie-bars.

U.S. Pat. No. 5,354,196 (Inventor: ZIV-AV et al.; Published: Jan. 13, 1998) discloses a tie bar-less clamp mechanism for an injection molding machine, which has platens mounted by pivots to separate a base and clamping frames.

U.S. Pat. No. 5,707,666 (Inventor: DISIMONE et al.; Published: Jan. 13, 1998) discloses an injection molding machine that is configured to support a stack mold that has a number of molding stations. The injection molding machine includes structure for supporting sets of mold plates and primary and secondary motion means in the form of linked arms for opening and closing all the molds simultaneously with uniform strokes.

U.S. Pat. No. 6,155,811 (Inventor: LOOIJE et al.; Published: Dec. 5, 2000) discloses a carrier assembly for supporting a mold center section of a stack mold. The carrier assembly has a pair of mold supports to which the mold center section can be attached. Each mold support is movable along a linear rail attached to the base of a molding machine and has at least one block containing a linear bearing mounted thereto for engaging the linear rail. Each mold support further includes a linkage assembly for connecting the mold support to other platens so as to synchronize movement of each mold support with movement of at least one other platen.

U.S. Pat. No. 6,503,075 (Inventor: SCHAD et al.; Published: Jan. 7, 2003) discloses a stack mold injection molding machine for molding articles, which includes a stack mold system including a carrier assembly with two mold supports, an actuator and a rotary union.

U.S. Pat. No. 7,125,247 (Inventor: GLAESENER et al.; Published: Oct. 24, 2006) discloses a linkage assembly for opening and closing a level stack mold, which includes two short pivoting arms connected to an anchor point, extending arms pivotally connected to carriers at its midpoint, and pair of arms extending between each assembly.

U.S. Pat. No. 7,229,268 (Inventor: DISIMONE; Published: Jun. 12, 2007) discloses a mold set guidance system for an injection molding machine, which has: (i) slightly raised surface on guide slots, that initially moves a core plate away from a machine face, and (ii) a wedge shaped portion at base of the guide slots.

United States Patent Application Number US 2006/0263470 (Inventor: VANDERPLOEG et al.; Published: Nov. 23, 2006) discloses, at paragraph 57: "a side view of the FIG. 2 embodiment showing the mold halves in the closed position. The figure shows the servo motors, the core plate, the cores, the cavity plate, the hot runner plates, and the hot runner. Secondary harmonic linkages are used transfer motion among the several pairs of mold core/cavity plates to ensure properly timed opening/closing of the mold plates."

United States Patent Application Number US 2007/0213868 (Inventor: MORTAZAVI et al.; Published: Sep. 13, 2007) discloses a system that includes a mold-moving assembly that is cooperative with an insert-forming station to form an insert at least in part. The mold-moving assembly is also cooperative with an overmolding station to overmold another insert previously formed by the insert-forming station in cooperation with the mold-moving assembly. The mold-moving assembly, when so actuated, moves inserts between the insert-forming station and the overmolding station. Operation of the insert-forming station and operation of the overmolding station overlap one another at least in part.

United States Patent Application Number US 2007/0250207 (Inventor: MACDONALD et al.; Published: Oct. 25, 2007) discloses a system including a mold-moving assembly configured to: cooperate with a molding station to mold a molded article, cooperate with an insert-integration station to integrate an insert with the molded article that was molded by the molding station in cooperation with the mold-moving assembly, and move molded articles between the molding station and the insert-integration station.

SUMMARY

According to a first aspect of the present invention, there is provided a platen-linkage assembly, including: (i) a pair of supports being movably guidable along a respective one of a pair of linear-guide rails, (ii) mold-carrier sections being configured to support a mold stack; and (iii) a pair of primary links being rotatably coupled with and being positioned between a chosen one of: (i) the mold-carrier sections, and (ii) the pair of supports.

A technical effect, amongst other technical effects, of the aspects of the present invention is improved footprint options for injection-molding systems.

DETAILED DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIG. 1 depicts perspective view of an injection-molding system 100 (hereafter "system 100") and a platen-linkage assembly 112 (hereafter the "assembly 112") according to a first non-limiting embodiment;

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENTS

The system 100 may include components that are known to persons skilled in the art, and these known components will not be described here; these known components are described, at least in part, in the following text books (by way of example): (i) "*Injection Molding Handbook*" by Osswald/Turng/Gramann (ISBN: 3-446-21669-2; publisher: Hanser), (ii) "*Injection Molding Handbook*" by Rosato and Rosato (ISBN: 0-412-99381-3; publisher: Chapman & Hill), and/or (iii) "*Injection Molding Systems*" 3$^{rd}$ Edition by Johannaber (ISBN 3-446-17733-7).

Figure 1:
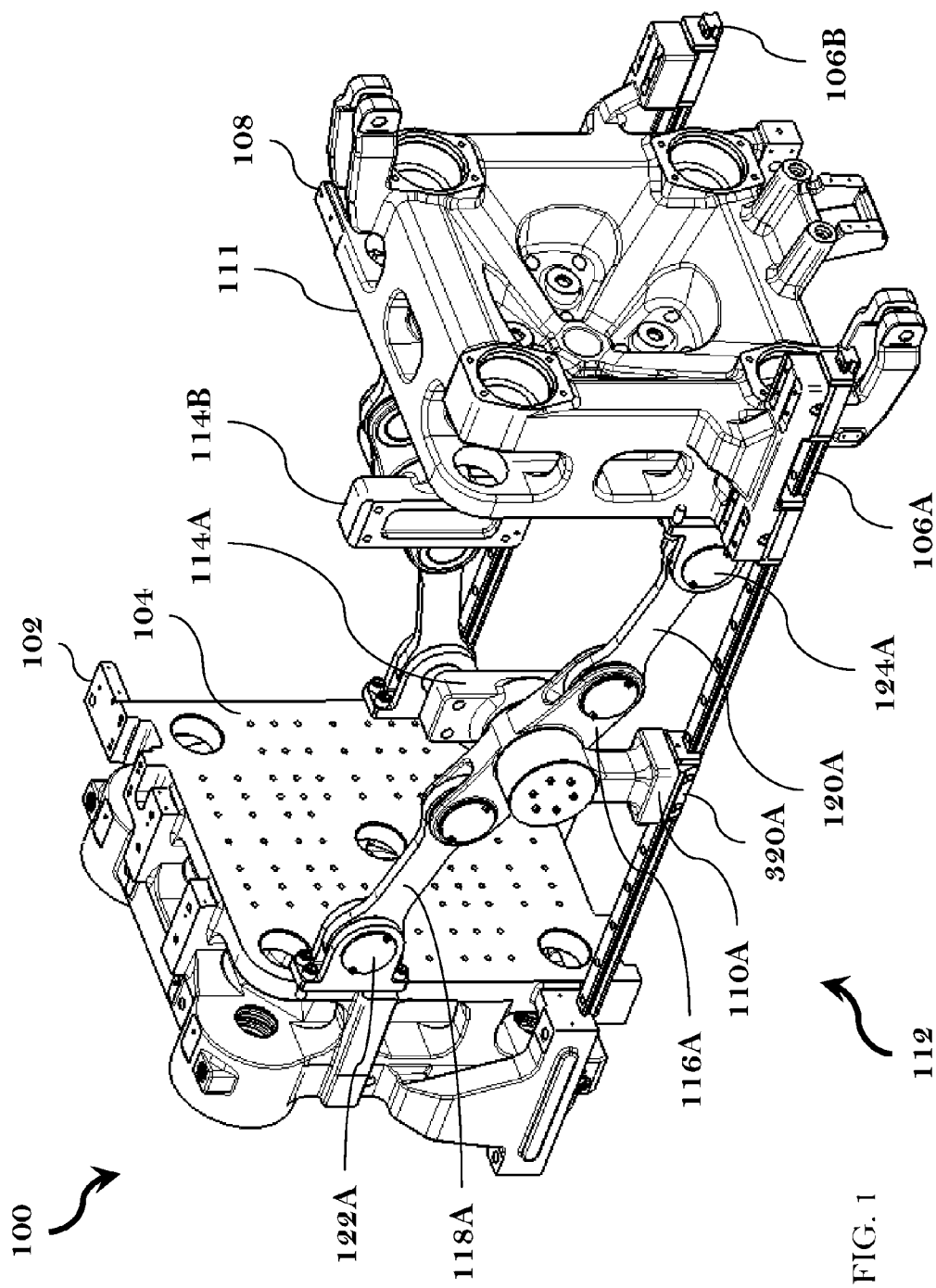
Figure 2:
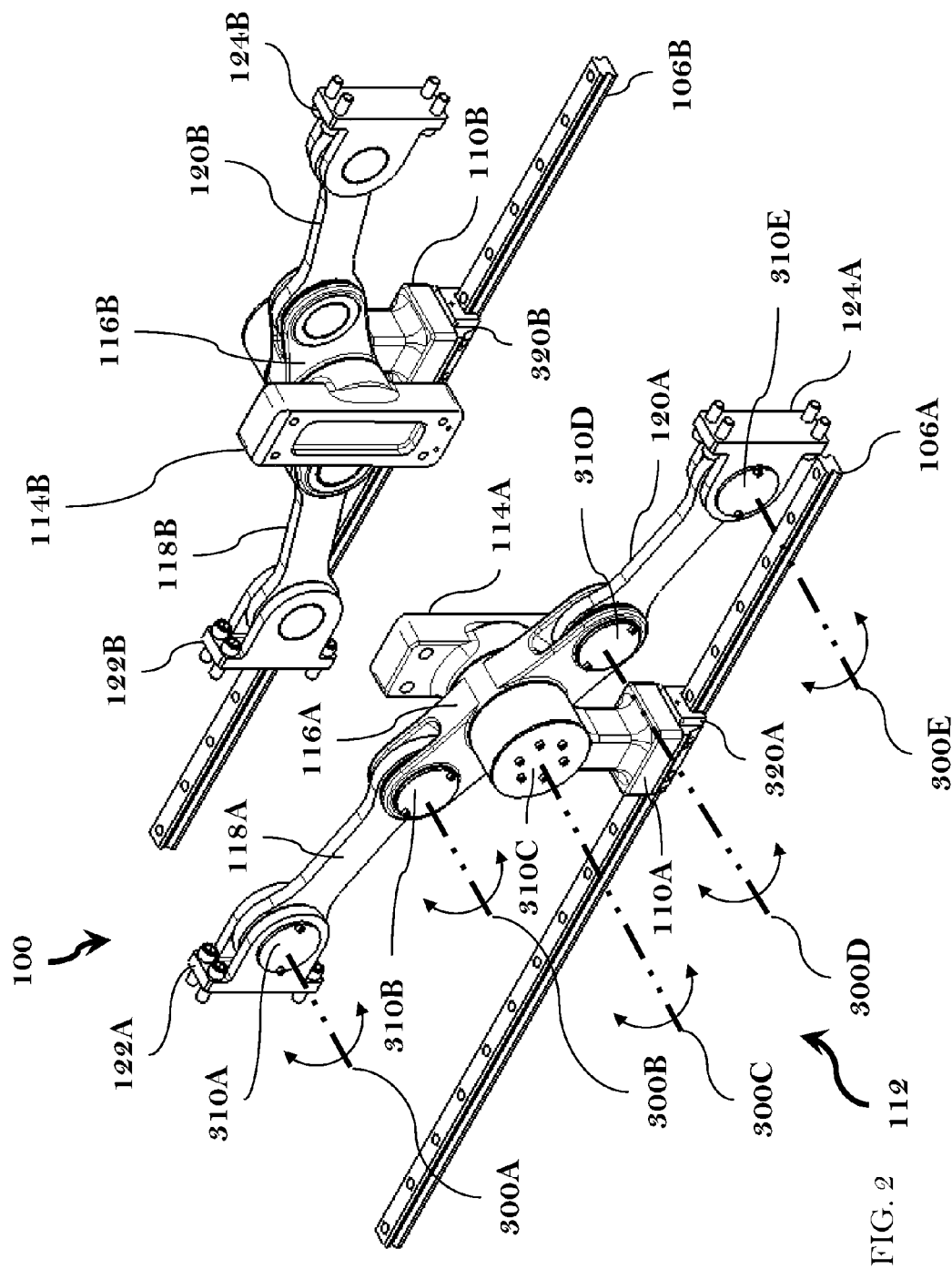
FIG. 2 depicts a perspective view of the assembly 112 according to a second non-limiting embodiment.

FIGS. 1 and 2 depict the perspective views of the system 100 and of the assembly 112. It will be appreciated that the system 100 and the assembly 112 may be sold together or sold separately. The system 100 includes (amongst other things): (i) the assembly 112, (ii) a stationary platen 102, (iii) a pair of linear-guide rails 106A, 106B (from time to time hereafter referred to as the "rails 106A, 106B"), and (iv) a movable platen 108. The stationary platen 102 has a stationary mold-support face 104 (hereafter referred to as the "face 104"). The movable platen 108 has a movable mold-support face 111 (hereafter referred to as the "face 111"). The face 111 is oriented toward the face 104. The rails 106A, 106B are positioned such that the rails 106A, 106B extend between the stationary platen 102 and the movable platen 108, so that (preferably) the rails 106A, 106B are positioned in a spaced-apart, parallel arrangement relative to each other. A platen-stroking actuator (not depicted, but known) is coupled to the movable platen 108, so that the movable platen 108 may be linearly movable along the rails 106A, 106B relative to the stationary platen 102 between the mold-opened case and the mold-closed case (which are depicted in FIGS. 3 and 4 respectively).

The assembly 112 includes (amongst other things): (i) a pair of supports 110A, 110B (from time to time hereafter referred to as the "supports 110A, 110B") that are offset from each other, (ii) mold-carrier sections 114A, 114B, (iii) a pair of primary links 116A, 116B (from time to time hereafter referred to as the "primary links 116A, 116B"), (iv) a first pair of secondary links 118A, 118B (from time to time hereafter referred to as the "secondary links 118A, 118 B"), and (v) a second pair of secondary links 120A, 120B (from time to time hereafter referred to as the "secondary links 120A, 120B"). The supports 110A, 110B are guidable and/or movable (that is, linearly translatable) along a respective one of the pair of linear-guide rails 106A, 106B. That is, the support 110A and the support 110B are movably guidable along the rail 106A and the rail 106B, respectively, between the stationary platen 102 and the movable platen 108. Linear-guide blocks 320A, 320B are positioned between the supports 110A, 110B and the rails 106A, 106B, respectively. The mold-carrier section 114A is rotatably coupled with: (i) the support 110A, and (ii) the support 110A. The mold-carrier section 114B is rotatably coupled with: (i) the support 110B, and (ii) the support 110B. It is understood that if it is desired so that the mold-carrier sections 114A and 114B do not rotate, so as to prevent the mold stack 117 from spinning or rotating about a horizontal axis, then the mold-carrier sections 114A and 114B do not rotate. However, if it is desired so that the mold-carrier sections 114A and 114B do rotate, so as to cause the mold stack 117 to spin about a horizontal axis, then the mold-carrier sections 114A and 114B do rotate and additional ancillary mechanisms may be required to align the mold stack 117 with its mating mold halves.

Figure 3:
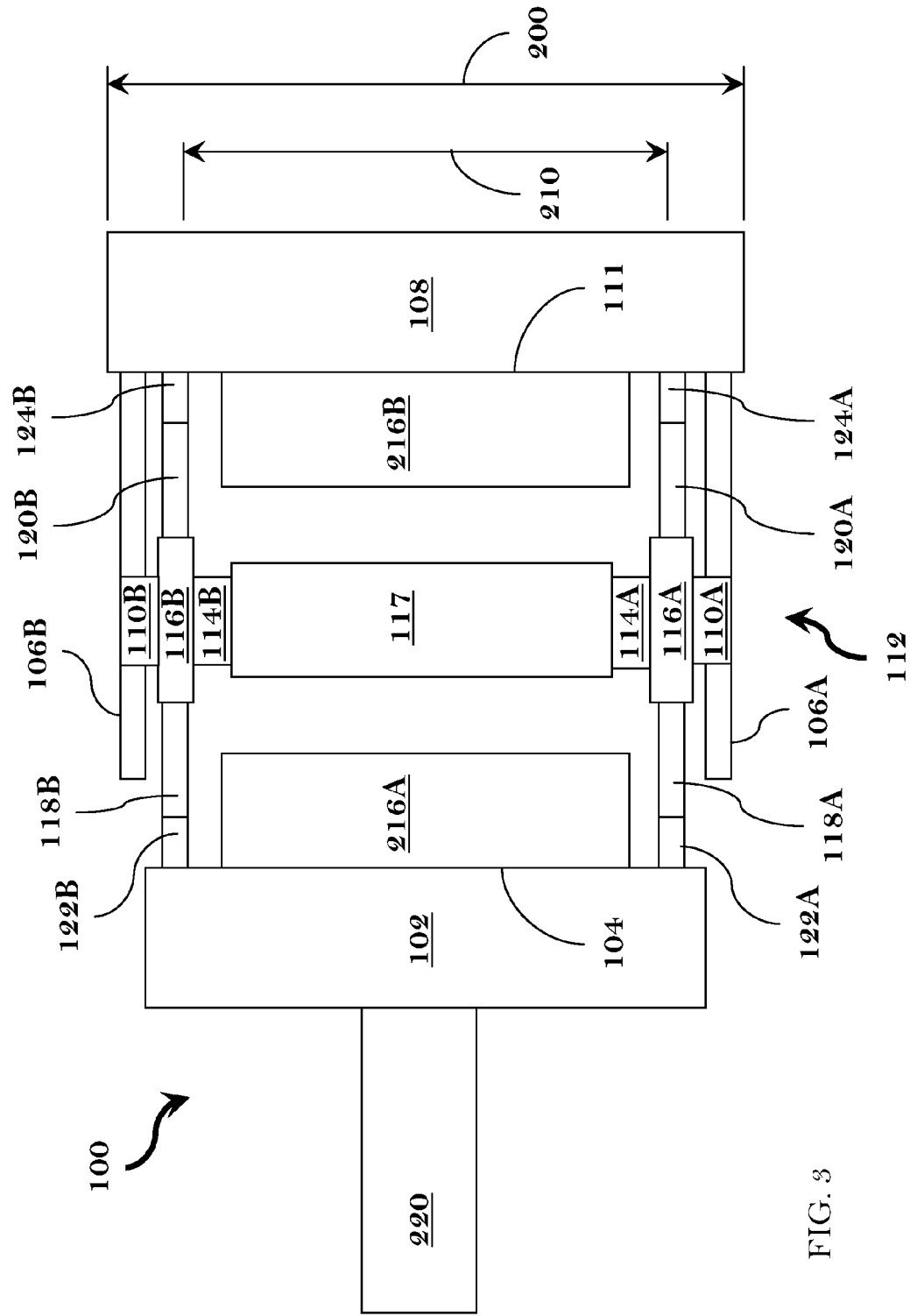
FIG. 3 depicts a top view of the system 100 of FIG. 1 in a mold-open case.
Figure 4:
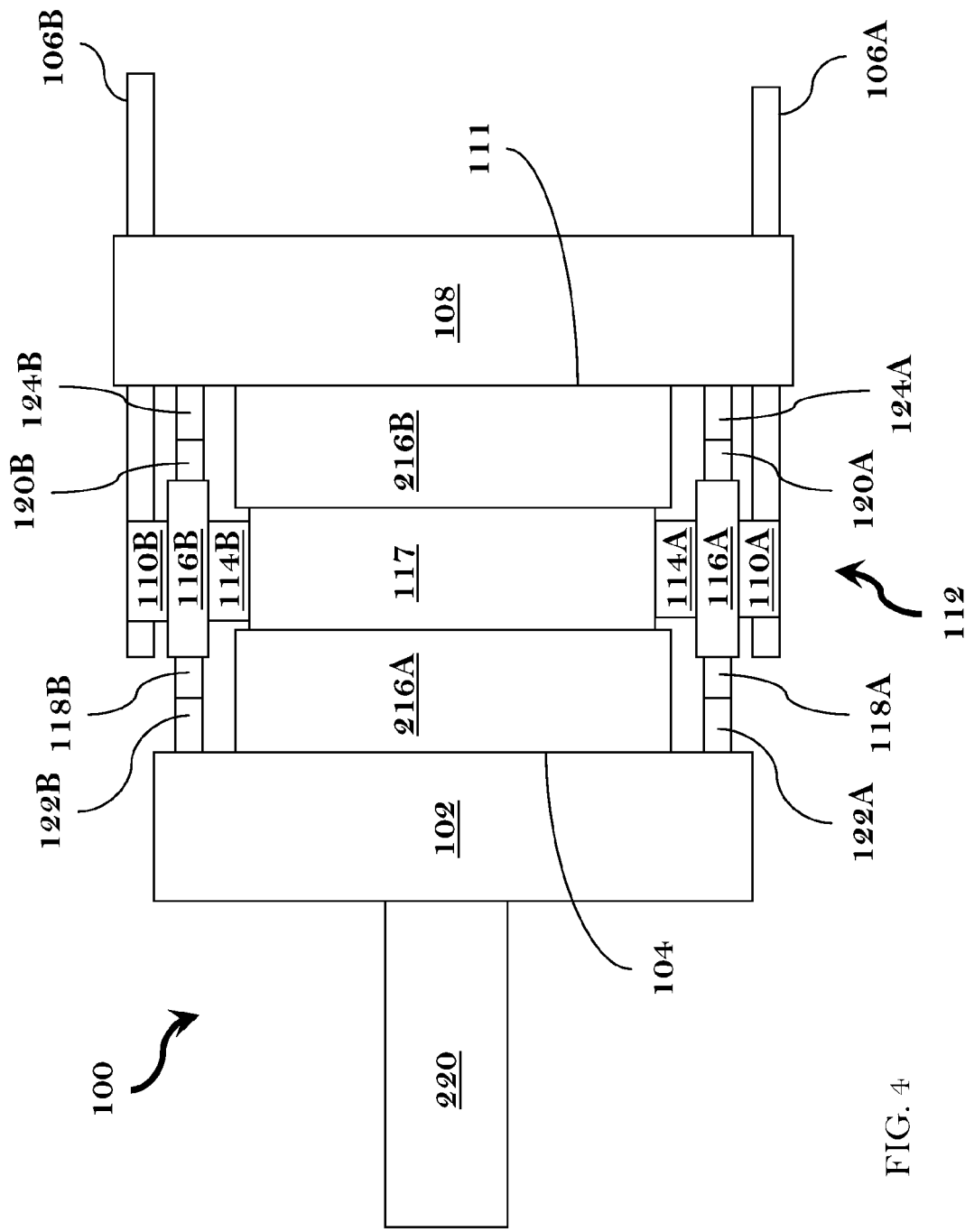
FIG. 4 depicts a top view of the system 100 of FIG. 1 in a mold-closed case.

The mold-carrier sections 114A, 114B are configured to couple with a mold stack 117 (which is depicted in FIGS. 3 and 4) so that the mold stack 117 is supported by the mold-carrier sections 114A, 114B. In this arrangement once the mold-carrier sections 114A, 114B are linearly moved along the rails 106A, 106B, the mold stack 117 may be linearly moved as well. The pair of primary links 116A, 116B is rotatably coupled with (and is positioned between) a chosen one of: (i) the mold-carrier sections 114A, 114B, and (ii) the pair of supports 111A, 110B. Specifically, the primary link 116A is: (i) rotatably coupled with the mold-carrier section 114A, and (ii) positioned between the mold-carrier section 114A and the support 111A. In addition, the primary link 116B is: (i) rotatably coupled with the mold-carrier section 114B, and (ii) positioned between the mold-carrier section 114B and the support 110B. The first pair of secondary links 118A, 118B is rotatably coupled with: (i) the stationary platen 102, and (ii) one end of the pair of primary links 116A, 116B. That is, the secondary link 118A is rotatably coupled with: (i) the primary link 116A, and (ii) the stationary platen 102. The secondary link 118B is rotatably coupled with: (i) the primary link 116B, and (ii) the stationary platen 102. The second pair of secondary links 120A, 120B is rotatably coupled with: (i) the movable platen 108, and (ii) one end of the pair of primary links 116A, 116B. That is, the secondary link 120A is rotatably coupled with: (i) the primary link 116A, and (ii) the stationary platen 102. The secondary link 120B is rotatably coupled with: (i) the primary link 116B, and (ii) the stationary platen 102.

The assembly 112 further includes (amongst other things): (i) a primary pair of clevises 122A, 122B (from time to time hereafter referred to as the "primary clevises 122A, 122B"), and (ii) a secondary pair of clevises 124A, 124B (from time to time hereafter referred to as the "secondary clevises 124A, 124B"). The primary pair of clevises 122A, 122B are: (i) connected with the face 104 of the stationary platen 102, and (ii) rotatably coupled with a selected one of the first pair of secondary links 118A, 118B. That is, the primary clevis 122A is rotatably coupled with the secondary link 118A, the primary clevis 122B is rotatably coupled with the secondary link 118B, and the primary clevises 122A, 122B are connected with the face 104 of the stationary platen 102. Once so mounted to the face 104, the primary clevis 122A is offset from the primary clevis 122B. The secondary pair of clevises 124A, 124B are: (i) connected with the face 111 of the movable platen 108, and (ii) rotatably coupled with a selected one of the second pair of secondary links 120A, 120B. That is, the secondary clevis 124A is rotatably coupled with the secondary link 120A, the secondary clevis 124B is rotatably coupled with the secondary link 120B, and the secondary devises 124A, 124B are connected with the face 111 of the movable platen 108. Once so mounted to the face 111, the secondary clevis 124A is offset from the secondary clevis 124B. The primary devises 122A, 122B and the secondary devises 124A, 124B are U-shaped devices having prongs, and the prongs define a hole at the end of each prong through which a pin or bolt may be pushed to secure another part in place.

The primary clevis 122A and the secondary link 118A rotate at a rotation axis 300A associated with a pivot 310A. The secondary link 118A and the primary link 116A rotate at a rotation axis 300B associated with a pivot 310B. A central region of the primary link 116A rotates at a rotation axis 300C associated with a pivot 310C. The secondary link 120A and the primary link 116A rotate at a rotation axis 300D associated with a pivot 310D. The secondary clevis 124A and the secondary link 120A rotate at a rotation axis 300E associated with a pivot 310E. The same arrangement, as described above, exists for corresponding elements of the assembly 112: that is, the rotation arrangement is the same for: (i) the primary clevis 122B and the secondary link 118B, (ii) the secondary link 118B and the primary link 116B, (iii) a central region of the primary link 116B, (iv) the secondary link 120B and the primary link 116B, and (v) the secondary clevis 124B and the secondary link 120B.

FIG. 3 depicts the top view of the system 100 of FIG. 1 in the mold-open case. The mold stack 117 cooperates with: (i) a stationary mold 216A that is mounted with the face 104 of the stationary platen 102, and (ii) a movable mold 216B that is mounted with the face 111 of the movable platen 108. As depicted in FIG. 3, the stationary mold 216A is offset from the mold stack 117, and the mold stack 117 is offset from the movable mold 216B so that in the mold-open case, molded articles may be removed from the stationary mold 216A and the movable mold 216B. That is, the molded articles may be ejected or removed either by robot (not depicted, but known) or by ejection mechanisms (not depicted, but known).

A technical effect of the assembly 112 (of amongst others) is that the assembly 112 is positioned relative to (or cooperative with) the stationary platen 102 and the movable platen 108 such that a system footprint 200 associated with the system 100 is at most a width (or side-to side length) of the stationary platen 102 and the movable platen 108. That is (more specifically), the assembly 112 is so positioned and so moved (along the rails 106A, 106B) that the assembly 112 remains within the width of the stationary platen 102 and the movable platen 108, and in this manner the system footprint 200 is minimized.

Another technical effect of the assembly 112 (of amongst others) is that a mold footprint 210 that is associated with the mold stack 117, the stationary mold 216A and the movable mold 216B may be arranged to be less than a side-to-side width (or side-to-side length) of the assembly 112. Specifically, the side-to-side width of the assembly 112 is arranged so as to maximize the side to side width of the mold footprint 210 while minimizing the system footprint 200.

In operation, the transition from the mold-open case (as depicted in FIG. 3) to the mold-closed case (as depicted in FIG. 4) includes (amongst other things) the following sequence: initially the movable platen 108 is offset and spaced apart from the stationary platen 102. The movable platen 108 is linearly stroked toward the stationary platen 102, so that the movable platen 108 pushes against the secondary links 120A, 120B, and this action causes: (A) the secondary links 120A, 120B to rotate relative to the movable platen 108, and (B) the primary links 116A, 116B to rotate relative to the secondary links 120A, 120B. In this manner, the primary links 116A, 116B and the secondary links 120A, 120B become oriented from a stretched position to an outstretched position. In response to the primary links 116A, 116B being rotated, the secondary links 118A, 118B become rotated relative to the stationary platen 102, so that the supports 110A, 110B (along with the mold stack 117 that is attached to the supports 110A, 110B) are linearly moved toward the stationary platen 102 until the stationary mold 216A the movable mold 216B are shut or closed against the mold stack 117 (so that then molded article may then be manufactured).

FIG. 4 depicts the top view of the system 100 of FIG. 1 in the mold-closed case. As depicted in FIG. 4, the stationary mold 216A abuts the mold stack 117, and the mold stack 117 abuts the movable mold 216B, so that in this case mold cavities are defined, which permits molded articles to be molded once an injection unit 220 (of the system 100) injects a molten molding material into the mold cavities. The mold cavities may be defined by the combination of: (i) the stationary mold 216A, the movable mold 216B, and/or (iii) the mold stack 117 (that is, once these components are closed together in the mold-closed position as depicted in FIG. 4). In operation, the transition from the mold-closed case (as depicted in FIG. 4) to the mold-open case (as depicted in FIG. 3) includes (amongst other things) the following sequence: the movable platen 108 is moved away from the stationary platen 102 so that the movable platen 108 causes the secondary links 120A, 120B to become rotated in a manner such that the secondary links 120A, 120B and the primary links 116A, 116B are oriented from the outstretched position to the stretched position; in response, the supports 111A, 110B become pulled toward the movable platen 108, and the secondary links 118A, 118B become rotated relative to the primary links 116A, 116B. The movable platen 108 is moved until the stationary mold 216A the movable mold 216B becomes offset from each other enough so that the molded articles may be removed or ejected from the stationary mold 216A, the movable mold 216B and/or the mold stack 117.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent are limited only by the scope of the following claims:

What is claimed is:

1. A platen-linkage assembly, comprising:
a pair of supports being movably guidable along a respective one of a pair of linear-guide rails;
mold-carrier sections being configured to: (i) support a mold stack, and (ii) rotatably
couple with a chosen one of the pair of supports;
a pair of primary links, each primary link of the pair of primary links being rotatably coupled with and being positioned between: (i) a selected one of the mold-carrier sections, and (ii) a selected one of the pair of supports;
a first pair of secondary links, each secondary link of the first pair of secondary links being rotatably coupled with: (i) a stationary mold-support face of a stationary platen, and (ii) one primary link of the pair of primary links; and
a second pair of secondary links, each secondary link of the second pair of secondary links being rotatably coupled with: (i) a movable mold-support face a movable platen, and (ii) one primary link of the pair of primary links.

2. The platen-linkage assembly of claim 1, further comprising:
   a primary pair of clevises, each clevis of the primary pair of clevises being: (i) connected with the stationary platen, and (ii) rotatably coupled with a selected secondary link of the first pair of secondary links.

3. The platen-linkage assembly of claim 1, further comprising:
   a secondary pair of clevises, each clevis of the secondary pair of clevises being: (i) connected with the movable platen, and (ii) rotatably coupled with a selected secondary link of the second pair of secondary links.

4. The platen-linkage assembly of claim 1, further comprising:
   a primary pair of clevises, each clevis of the primary pair of clevises being: (i) connected with the stationary platen, and (ii) rotatably coupled with a selected secondary link of the first pair of secondary links; and
   a secondary pair of clevises, each clevis of the secondary pair of clevises being: (i)
   connected with the movable platen, and (ii) rotatably coupled with a selected clevis of the second pair of secondary links.

5. The platen-linkage assembly of claim 1, wherein:
   the mold stack cooperates with: (i) a stationary mold that is mounted with the stationary mold-support face of the stationary platen, and (ii) a movable mold that is mounted with the movable mold-support face of the movable platen.

6. The platen-linkage assembly of claim 1, wherein:
   the mold stack cooperates with: (i) a stationary mold that is mounted with the stationary mold-support face of the stationary platen, and (ii) a movable mold that is mounted with the movable mold-support face of the movable platen,
   the platen-linkage assembly is so positioned relative to the stationary platen and the movable platen such that:
   a system footprint associated with an injection-molding system is at most a width of the stationary platen and the movable platen.

7. The platen-linkage assembly of claim 1, wherein:
   the mold stack cooperates with: (i) a stationary mold that is mounted with the stationary mold-support face of the stationary platen, and (ii) a movable mold that is mounted with the movable mold-support face of the movable platen,
   the platen-linkage assembly is so positioned relative to the stationary platen and the movable platen such that: (i) a system footprint associated with an injection-molding system is at most a width of the stationary platen and the movable platen, and (ii) a mold footprint that is associated with the mold stack, the stationary mold and the movable mold is less than a side-to-side width of the platen-linkage assembly so as to maximize the mold footprint while minimizing the system footprint.

8. The platen-linkage assembly of claim 1, further comprising:
   a primary pair of clevises, each clevis of the primary pair of clevises being: (i) connected with the stationary platen, and (ii) rotatably coupled with a selected secondary link of the first pair of secondary links; and
   a secondary pair of clevises, each clevis of the secondary pair of clevises being: (i) connected with the movable platen, and (ii) rotatably coupled with a selected secondary link of the second pair of secondary links,
   the mold stack cooperates with: (i) a stationary mold that is mounted with the stationary mold-support face of the stationary platen, and (ii) a movable mold that is mounted with the movable mold-support face of the movable platen, the platen-linkage assembly is so positioned relative to the stationary platen and the movable platen such that: (i) a system footprint associated with an injection-molding system is at most a width of the stationary platen and the movable platen, and (ii) a mold footprint that is associated with the mold stack, the stationary mold and the movable mold sis less than a side-to-side width of the platen-linkage assembly so as to maximize the mold footprint while minimizing the system footprint.

9. An injection-molding system having the platen-linkage assembly of claim 1.

* * * * *